United States Patent
Lv et al.

(10) Patent No.: US 11,099,996 B2
(45) Date of Patent: Aug. 24, 2021

(54) METHOD, DEVICE, AND COMPUTER PROGRAM PRODUCT FOR PREFETCHING IN STORAGE SYSTEMS

(71) Applicant: EMC IP Holding Company LLC, Hopkinton, MA (US)

(72) Inventors: Shuo Lv, Beijing (CN); Ming Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/382,357

(22) Filed: Apr. 12, 2019

(65) Prior Publication Data

US 2019/0384711 A1    Dec. 19, 2019

(30) Foreign Application Priority Data

Jun. 15, 2018   (CN) .......................... 201810618354.0

(51) Int. Cl.
*G06F 12/00* (2006.01)
*G06F 12/0862* (2016.01)
*G06F 12/0882* (2016.01)

(52) U.S. Cl.
CPC ...... *G06F 12/0862* (2013.01); *G06F 12/0882* (2013.01)

(58) Field of Classification Search
CPC .......................... G06F 12/0862; G06F 12/0882
See application file for complete search history.

(56) References Cited

U.S. PATENT DOCUMENTS

| | | | |
|---|---|---|---|
| 6,834,330 B2 | 12/2004 | Yochai | |
| 7,899,996 B1 | 3/2011 | Orit | |
| 8,463,781 B1 | 6/2013 | Yoav et al. | |
| 9,026,740 B1 | 5/2015 | Shilane et al. | |
| 9,201,573 B1 | 12/2015 | Miles et al. | |
| 10,496,542 B1 | 12/2019 | Yamini et al. | |
| 2009/0055595 A1* | 2/2009 | Gill | G06F 12/0862 711/137 |
| 2009/0216956 A1* | 8/2009 | Ekanadham | G06F 12/0862 711/137 |
| 2012/0054448 A1* | 3/2012 | Thompson | G06F 12/0862 711/137 |
| 2015/0046659 A1* | 2/2015 | Wu | G06F 12/0862 711/137 |
| 2017/0168946 A1* | 6/2017 | Wang | G06F 12/0862 |
| 2019/0310853 A1* | 10/2019 | Bera | G06F 12/0862 |
| 2019/0384711 A1* | 12/2019 | Lv | G06F 12/08 |

* cited by examiner

*Primary Examiner* — Baboucarr Faal
(74) *Attorney, Agent, or Firm* — BainwoodHuang

(57) ABSTRACT

In accordance with certain techniques, prefetching operation may be divided into two parts: a trigger part and an execution part, thereby simplifying the prefetching process. Such techniques may further support prefetching of concurrent flows and enhance anti-interference capability. Certain techniques involve receiving a read request for a memory page, and determining whether the read request satisfies a trigger condition of a prefetching operation for the memory page. These certain techniques further involve, in response to the read request satisfying the trigger condition, determining a window size of the prefetching operation based on historical information of historical prefetching operations for the memory page, and triggering, based on the window size, execution of the prefetching operation.

14 Claims, 6 Drawing Sheets

METHOD, DEVICE, AND COMPUTER PROGRAM PRODUCT FOR PREFETCHING IN STORAGE SYSTEMS

CROSS-REFERENCE TO RELATED APPLICATION(S)

This application claims priority to Chinese Patent Application No. CN201810618354.0, on file at the China National Intellectual Property Administration (CNIPA), having a filing date of Jun. 15, 2018, and having "METHOD, DEVICE AND COMPUTER PROGRAM PRODUCT FOR PREFETCHING IN STORAGE SYSTEMS" as a title, the contents and teachings of which are herein incorporated by reference in their entirety.

FIELD

Embodiments of the present disclosure generally relate to storage management, in particular, to a method, a device and a computer program product for a prefetching operation in a storage system.

BACKGROUND

Prefetching technologies have already been widely applied to storage systems. In current storage systems, prefetching hides disk I/O latency from the upper application. It is very useful for I/O and computation intensive workloads, such as science and engineering calculations. Without prefetching, a processor has to wait for a disk to load data, while CPU is busy to process data, the disk is idle. This alternating idleness and waiting waste system resources. Prefetching may reduce processor waiting time and make parallel work with disk to achieve pipeline operations. However, in diverse workloads, the conventional prefetching algorithms may not work normally.

SUMMARY

Generally, embodiments of the present disclosure provide a device and a computer program product for storage management.

In a first aspect of the present disclosure, there is provided a computer-implemented method. The method may include: receiving a read request for a memory page; determining whether the read request satisfies a trigger condition of a prefetching operation for the memory page; in response to the read request satisfying the trigger condition, determining a window size of the prefetching operation based on historical information of historical prefetching operations for the memory page; and triggering, based on the window size, execution of the prefetching operation.

In a second aspect of the present disclosure, there is provided an electronic device. The device may include: at least one processing unit; and at least one memory coupled to the at least one processing unit and storing machine-executable instructions, the instructions, when executed by the at least one processing unit, causing the device to perform acts, the acts including: receiving a read request for a memory page; determining whether the read request satisfies a trigger condition of a prefetching operation for the memory page; in response to the read request satisfying the trigger condition, determining a window size of the prefetching operation based on historical information of historical prefetching operations of the memory paged; and triggering, based on the window size, execution of the prefetching operation.

In a third aspect of the present disclosure, there is provided a computer program product tangibly stored on a non-transient computer readable medium and including machine executable instructions which, when executed, cause the machine to perform: receiving a read request for a memory page; determining whether the read request satisfies a trigger condition of a prefetching operation for the memory page; in response to the read request satisfying the trigger condition, determining a window size of the prefetching operation based on historical information for historical prefetching operations of the memory page; and triggering, based on the window size, execution of the prefetching operation.

This Summary is provided to introduce a selection of concepts that are further described below in the Detailed Description in a simplified form. This Summary is not intended to identify key features or essential features of the present disclosure, nor is it intended to be used to limit the scope of the claimed subject matter.

BRIEF DESCRIPTION OF THE DRAWINGS

The above and other objectives, features, and advantages of the present disclosure will become more apparent through the more detailed description of the example embodiments of the present disclosure with reference to the accompanying drawings, wherein the same reference sign generally refers to the like element in the example embodiments of the present disclosure.

DETAILED DESCRIPTION OF EMBODIMENTS

Figure 1:
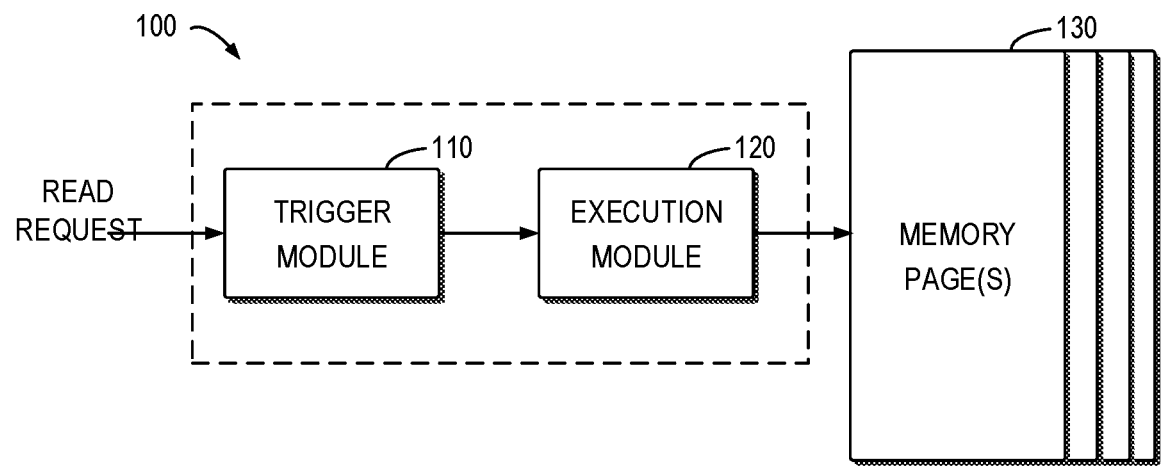
FIG. 1 illustrates a schematic block diagram of an architecture of a storage system according to embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more details with reference to the drawings. Although the preferred embodiments of the present disclosure are illustrated in the drawings, it should be understood that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one another embodiment." The terms "first", "second" and so on can refer to same or different objects. The following text also can include other explicit and implicit definitions.

The term "memory page" used herein describes a physical memory block which is of a fixed size and includes data to be read or written.

The term "prefetching" used herein may refer to, through overlap of computation and access, sending a prefetching request before cache might fail, to deposit data blocks in the cache in advance before data are truly used, thereby avoiding processor pause caused by cache failures.

A conventional prefetching method monitors all file access request and determines a prefetching operation based on the request. Table 1 shows a plurality of conventional prefetching execution sequence.

TABLE 1

| criterion | case |
| --- | --- |
| offset == 0 && prev_offset == −1 | First visit to the file |
| offset == prev_offset | unaligned consecutive read request for the file |
| offset == prev_offset + 1 | trivial consecutive read request for the file |

"Offset" in Table 1 represents an offset of the read request, and "prev_offset" represents an offset of a previous read request.

Table 2 illustrates a pseudo-code of a conventional prefetching method.

TABLE 2

```
File_OpenFile::readBlock
    call File_Fork::readAhead
    for each BlockIndex64_t
        if is currentPosition +1
            call File_Fork::readAhead
        if buffer cache not cached
            report cache miss
            leave cache hit mode
File_Fork::readAhead
    handle unaligned read
    set currentPosition to current BlockIndex64 index
    if in cache hit mode
        return
    shift currentPositionto the last requested buffer cache
        but no more than ra_buffer_cache
    if is sequential read and no current_window
        make current_window
    call blockable_buffer_cache_readahead
    if is oversize read
```

TABLE 2-continued

```
        call make_ahead_window
    elseif is random read
        clear readhhead windows
        limit size to ra_buffer_caches
        call blockable_buffer_cache_readahead
    elseif no ahead_window
        call make_ahead_window
    elseif read request crossed into ahead_windows
        advance current_window to ahead_window
        call make_ahead_window
    ensure currentPosition do not overrun ahead_windows
make_ahead_window
    if have seen cache miss
        clear cache miss status
        decrease readahead size by 2
    else
        x4 or x2 readahead size
        limit size to ra_buffer_caches
    call blockable _buffer_cache_readahead
        if is blockable and queue congested
            return
        submit readahead io
        if too many continuous cache hits
            clear readahead windows
            enter cache hit mode
```

Generally, the conventional prefetching method normalizes the read request at first. If the number of read request buffer caches is greater than ra_buffer_caches, it is truncated to ra_buffer_caches. Then the read request is compared with the position of the ahead window. Once they are intersected, a new prefetching I/O is immediately started and it points the new current window to the original ahead window and sets the new ahead window to the newly submitted I/O area.

The conventional prefetching method is unconditionally triggered by every read request and performs strict type matching. However, the conventional prefetching method has the following problems: (1) there are minor interferences in the production environment, and the prefetching window is closed and unable to effectively support diverse load types; (2) the prefetching is too frequent.

The core prefetching state of the conventional prefetching algorithm includes two prefetching windows: the current window and the ahead window. Two windows are maintained for prefetching. When the application accesses the data in the current window and progressively advances, the file system prefetches the I/O asynchronously in the ahead window to load the data from disk in advance. The conventional two-window scenario does not provide an accurate answer to the asynchronous prefetching time because both the read request and the ahead window are in one area.

In addition, it is also necessary to judge and deal with lots of exceptions. For example, the exceptions may include: the prefetching method is disabled; the disk device is too busy to do asynchronous prefetching immediately; the file is cached and no need prefetching; too large memory pressure to reduce the prefetching size; next asynchronous prefetching has come or not, and on the like. The above logic is intertwined, making the conventional prefetching algorithm quite complex.

To at least in part solve the above and other potential problems, embodiments of the present disclosure provide an improved prefetching method. According to embodiments of the present disclosure, the prefetching operation may be divided into two parts: a trigger part and an execution part, thereby simplifying the prefetching process. Embodiments of the present disclosure support prefetching of concurrent flows and enhance anti-interference capability.

FIG. 1 illustrates a schematic block diagram of an architecture of storage system 100 according to embodiments of the present disclosure. As shown in FIG. 1, the architecture of storage system 100 may include a trigger module 110, an execution module 120 and a memory page 130. It should be appreciated that the storage system architecture 100 may include any suitable components, for example, one or more disks. The numbers of components shown in FIG. 1 are only examples not limitations. It may be appreciated that the trigger module 110 and the execution module 120 may be software modules and/or hardware modules. Embodiments of the present disclosure are not limited in this aspect. For example, in some embodiments, the trigger module 110 may be embedded in a read request function, such as File_OpenFile::readBlock, and checks whether a target read request satisfies the prefetching trigger condition. The execution module 120 is logically included of a group of independent decision-making submodules, each submodule matches and processes an access mode. In this way, if a new access mode needs to be supported, it is only necessary to add a matching pattern and a processing module. Therefore, prefetching logic becomes very clear, concise and effective, so that the prefetching time is shorten effectively.

Figure 2:
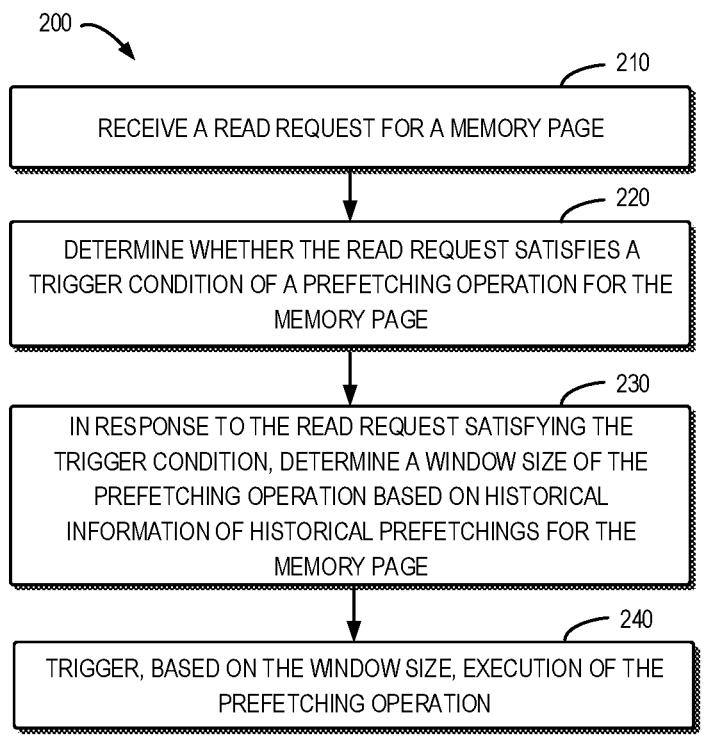
FIG. 2 illustrates a flow chart of a method according to embodiments of the present disclosure.

FIG. 2 illustrates a flow chart of a method 200 according to embodiments of the present disclosure. It should be appreciated that the method 200 may be implemented in the architecture of storage system 100 shown in FIG. 1.

At block 210, the trigger module 210 receives a read request to the memory page 130. In some embodiments, the trigger module 210 may determine which memory page the read request is associated with. For example, the trigger module 210 may determine a corresponding memory page according to memory page address information included in the read request.

At block 220, the trigger module 210 judges whether the read request satisfies a trigger condition of the prefetching operation. In some embodiments, if the read operation is an initial read request to the memory page 130, the request may trigger the prefetching operation for the memory page 130.

In other embodiments, the trigger module 210 may determine whether the read request satisfies the trigger condition of the prefetching operation based on historical information of historical prefetching operations. For example, after a previous prefetching operation finishes, a flag may be set to indicate time of a subsequent prefetching operation.

In this way, the read request satisfying the trigger condition may trigger the prefetching operation, and not all read requests trigger the prefetching operation, thereby effectively reducing I/O consumption.

At block 230, if the read operation satisfies the trigger condition of prefetching operation, the execution module 120 determines a window size of the triggered prefetching operation. If the prefetching is the initial prefetching with respect to the memory page 130, namely, there is no historical information of prefetching operation with respect to the memory page 130, the window size of the prefetching operation may be determined according to the size of the read request. In some embodiments, the window size of the prefetching operation and the size of the read request may be determined according to the following equation (1):

$$size=read\_size*modulus\ 0 \tag{1}$$

where "size" represents the window size of the prefetching operation of this time, "read_size" represents the size of the read request, and "modulus 0" represents a multiple parameter such as 2 or 4. It should be appreciated that modulus 0 may take any suitable value. The window size of the prefetching operation and size of the read request may also be in a nonlinear relationship.

If the triggered prefetching operation is not the initial prefetching operation, the execution module 120 may determine the size of the prefetching operation according to a historical prefetching operation. For example, in some embodiments, the window size of the prefetching operation may be determined based on the following equation (2):

$$size=prev\_size*modulus\ 1 \tag{2}$$

where "size" represents the window size of the prefetching operation of this time, "prev_size" represents the window size of a previous prefetching operation, and "modulus 1" represents a multiple parameter such as 2. It should be appreciated that modulus 1 may take any suitable value. The window size of the prefetching operation of this time and size of the window size of the previous prefetching operation may also be in a nonlinear relationship.

In some embodiments, if the prefetching operation is asynchronous prefetching, an amount of a prefetching advance may be set. For example, in some embodiments, the prefetching advance may be equal to the window size of the previous prefetching operation, and the advanced amount of prefetching of the initial prefetching may be a difference between the widow size of the initial prefetching operation and the size of the read request. It may be appreciated that any proper prefetching advance may be set.

In some embodiments, the size of the prefetching window may be determined through the following equation (3):

$$size\_actual=min(size/ASYNC\_RATIO, ra\_buffer\_caches) \tag{3}$$

where "size" represents the window size of the prefetching operation, "size_actual" represents that the window size ASYNC_RATIO of an actual prefetching operation may take a value 8. When the memory is sufficient, asynchronous prefetching is completely employed; otherwise the asynchronous prefetching quantity is reduced to about ⅛ of a pre-read size. In this manner, it is possible to reduce almost half of prefetching memory consumption without sacrificing the I/O size, if the memory is tense.

Table 3 shows information of three sequential prefetching operations. It should be understood that values shown in Table 3 are only for illustration purpose, not to limit the present disclosure.

TABLE 3

| Buffer cache | Prefetching type | Size of prefetching window | Prefetching advance |
|---|---|---|---|
| 0 | Initial prefetching | 4*read_size = 4 | Size-read_size = 3 |
| 1 | Sequential prefetching | 2*prev_size = 8 | Size = 4 |
| 4 | Sequential prefetching | 2*prev_size = 16 | Size = 8 |

As can be seen from Table 3, the prefetching for the buffer cache 0 may be prefetched to the buffer cache 3; the prefetching for the buffer cache 1 may be prefetched to the buffer cache 7; the prefetching for the buffer cache 4 may be prefetched to the buffer cache 15. In some embodiments, if a subsequent read request is a prefetch with respect to the buffer cache 3, the trigger module 110 may determine that the read request does not satisfy the trigger condition because content of the buffer cache 3 has already been prefetched in advance, thereby effectively reducing the I/O consumption. In some embodiments, an upper limit of the size of the window of the prefetching operation is determined based on the size (ra_buffer_caches) of the buffer cache.

Figure 3:
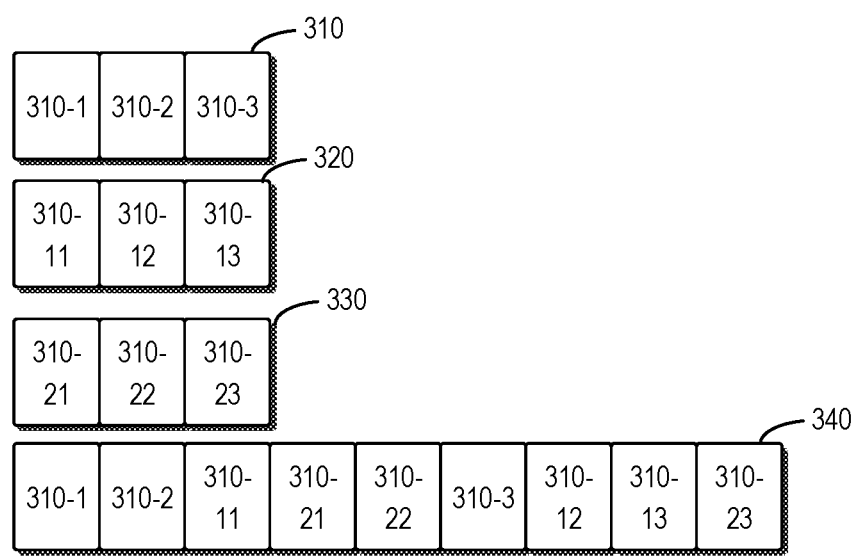
FIG. 3 illustrates a diagram of a sequence of read request operations according to the present disclosure.

In some embodiments, the read request with respect to the memory page 130 is interleaved. As shown in FIG. 3, the present read request sequences 310, 320 and 330 are sequential and concurrent, so the prefetching operation for the memory page 130 may be interleaved. It should be appreciated that embodiments of the present disclosure may support any suitable prefetching operation modes. For example, the prefetching operation mode may be a matrix-type and/or random. In an example embodiment, prefetching modes that may be supported by the storage system architecture 100 may be expanded by adding the execution module 120 submodules that enable different access types.

At block 240, the execution module 120 triggers and executes the prefetching operation based on the size of the window. In some embodiments, if the prefetching operation is the initial prefetching operation, disk I/O is started to load the current buffer cache, and at the same time the application may be temporarily suspended to wait for the I/O. In some embodiments, it is possible to determine adjacent cache to be accessed and start synchronous prefetching.

In some embodiments, if historical information includes a flag associated with the prefetching operation of this time, the flag may be cleared after the prefetching operation of this time is triggered, so as to avoid repeated trigger. In other embodiments, it is possible to set a flag for a subsequent prefetching operation after the prefetching operation of this time.

Table 4 shows pseudo-codes of some embodiments of the present disclosure. It should be appreciated that pseudo-codes in Table 4 are only examples not limitations.

the throughputs of both methods are very high in a single first continuous read. When there are two concurrent read sequences interleaved, the throughput of the conventional method rapidly falls to 300 M/S and 280 MBM/S, whereas the throughput according to embodiments of the present disclosure is not affected. When there are up to 10 concurrent read sequences, the throughput of the conventional method rapidly falls to 122.9 MB/S, whereas the throughput according to embodiments of the present disclosure is still higher than 353 MB/s.

Figure 4A:
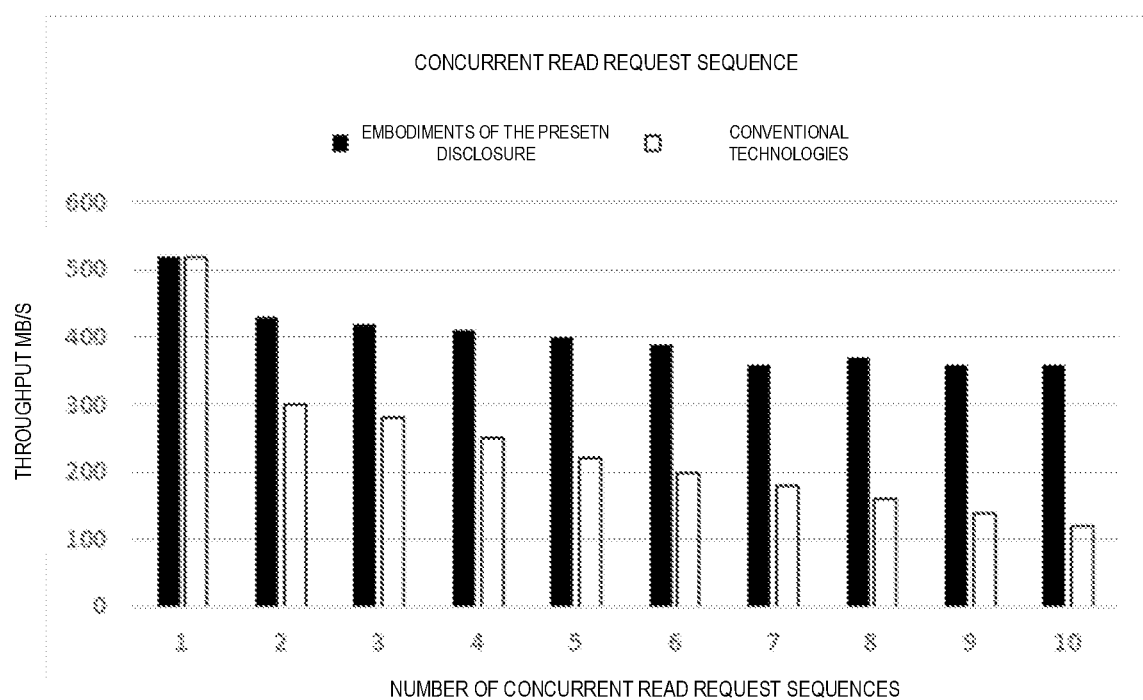
FIG. 4A and FIG. 4B illustrate a schematic diagram of a performance of a storage system according to embodiments of the present disclosure.
Figure 4B:
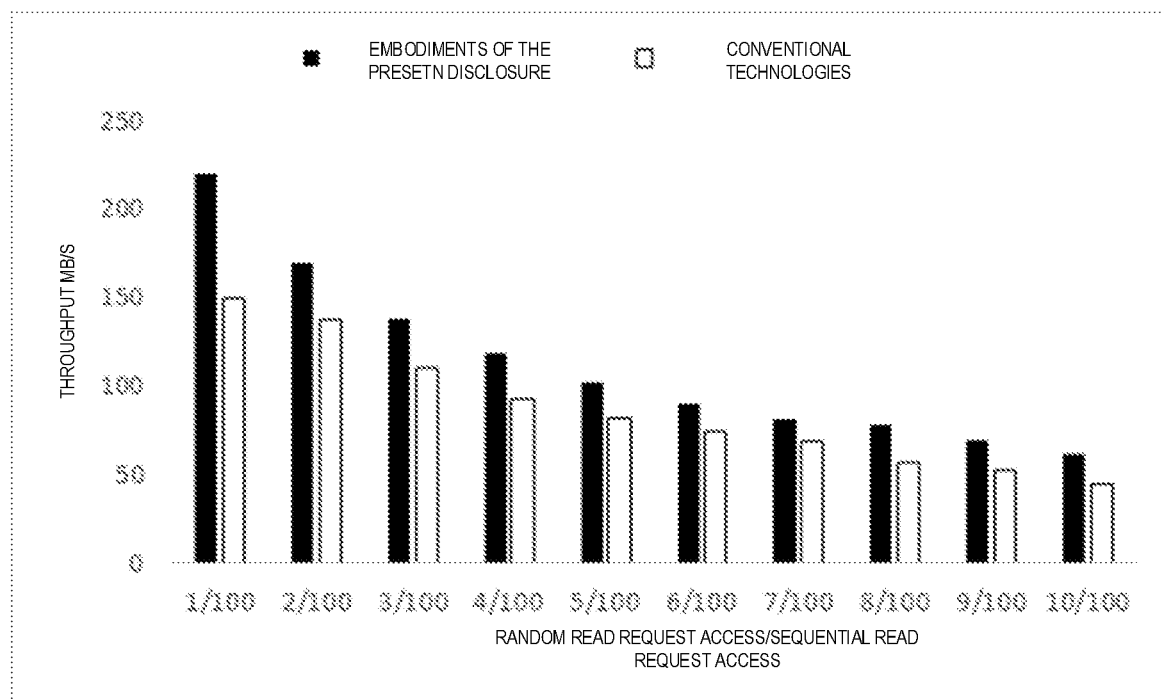

FIG. 4B shows a diagram of simulation results of performance of the storage system according to embodiments of the present disclosure and the storage system according to a conventional method. In the simulation environment shown in FIG. 4B, it is feasible to create a 2G file, and then the file may be accessed by mixed random and sequential access. The sequential part starts from the beginning of the file and ends at the $1000^{th}$ MB. Random reads are distributed in the latter half of the file. Data accessed sequentially was 1000 MB, while the random access increased gradually from 1 MB to 100 MB. Every read request has a complete buffer cache 8 KB.

As can be seen from FIG. 4B, overall I/O throughput for the prefetching operations decrease with increasing random access, and the prefetching operation according to embodiments of the present disclosure maintains a considerable advantage over the conventional method. When the ratio of random access to sequential access is 1:100, the throughput of the conventional method is 170.18 MB/S, the throughput of the method according to embodiments of the present disclosure is 220.15 MB/S, and the performance of the method according to embodiments of the present disclosure has improved by 28.9%. When the random access ratio rises

TABLE 4

```
Read:
    for each blockindex
        if not cached                          //missing buffer
cache
            call readahead
            if test-and-clear BUF __            //prefetching
mark
            call readahead
            save last read position
    prefetching:
        if is async prefetching and queue congested    // queue
congested
            return
        if sequential                           // first
prefetching
            setup initial window
        else if hit BUF __prefetching           // subsequential
prefetching
            recover window if necessary         // interleaved
prefetching
            ramp up and push forward window
        else                                    //small random
prefetching
            read as is; return
        submit readahead io
        mark new BUF __prefetching buffer       // prefetching
mark
```

FIG. 4B and FIG. 4B illustrate a diagram of simulation results of performance of the storage system according to embodiments of the present disclosure. FIG. 4A shows a diagram of simulation results of performance of the storage system according to embodiments of the present disclosure and the storage system according to a conventional method. In the simulation environment shown in FIG. 4A, the size of the read request is 8 KB. It can be seen from FIG. 4A that to 10:100, the throughput of the conventional method is 50.10 MB/S and the throughput of the method according to embodiments of the present disclosure is 60.39 MB/S. The performance of the method according to embodiments of the present disclosure has improved by 25.4%.

Figure 5:
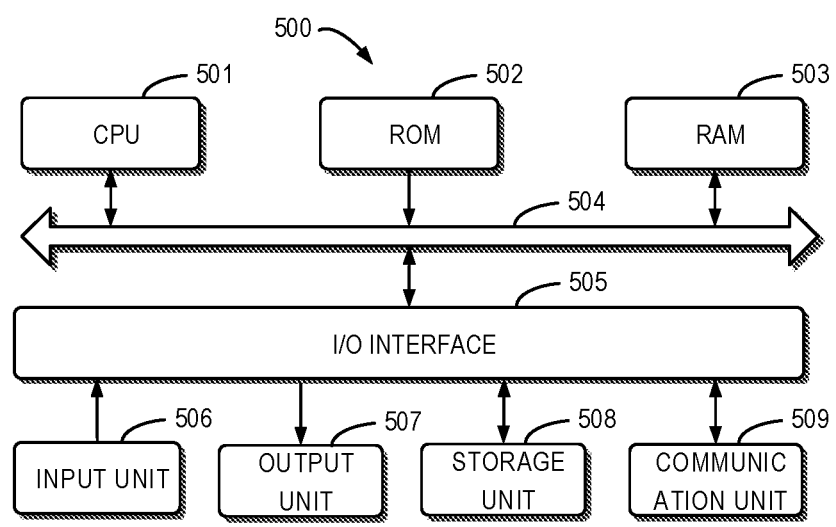
FIG. 5 illustrates a schematic block diagram of a device according to embodiments of the present disclosure.

FIG. 5 illustrates a schematic block diagram of an electronic device 500 for implementing embodiments of the present disclosure. As shown, the device 500 includes a central process unit (CPU) 501, which can execute various suitable actions and processing based on computer program instructions stored in a read-only memory (ROM) 502 or computer program instructions loaded in a random-access memory (RAM) 503 from a storage unit 508. The RAM 503 can also store all kinds of programs and data required by the operations of the device 500. The CPU 501, ROM 502 and RAM 503 are connected to each other via a bus 504. An input/output (I/O) interface 505 is also connected to the bus 504.

A plurality of components in the device 500 is connected to the I/O interface 505, including: an input unit 506, such as keyboard, mouse and the like; an output unit 507, such as various kinds of display and loudspeakers and the like; a storage unit 508, such as a disk and an optical disk etc.; and a communication unit 509, such as a network card, a modem, a wireless transceiver and the like. The communication unit 509 allows the device 500 to exchange information/data with other devices via the computer network, such as Internet, and/or various telecommunication networks.

Each of the above described procedures and processing, such as procedure 200, can also be executed by a processing unit 501. For example, in some embodiments, the procedure 200 can be implemented as a computer software program tangibly included in a machine-readable medium, such as the storage unit 508. In some embodiments, the computer program can be partially or fully loaded and/or mounted to the device 500 via the ROM 502 and/or the communication unit 509. When the computer program is loaded to RAM 503 and executed by the CPU 501, one or more steps of the above described procedure 200 can be implemented. Alternatively, in some embodiments, the CPU 501 also can be configured in any other suitable manners to perform the above procedures.

The present disclosure can be a method, an apparatus, a system and/or a computer program product. The computer program product can include a computer-readable storage medium, on which computer-readable program instructions for executing various aspects of the present disclosure are loaded.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means (e.g., circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which includes one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, the method comprising:
   receiving a read request for a memory page;
   determining whether the read request is an initial read request for the memory page, the read request having a read request size;
   in response to determining that the read request is the initial read request for the memory page, determining an initial window size of a prefetching operation based on the read request size;
   in response to determining that the read request is not the initial read request for the memory page, determining whether a flag associated with the prefetching operation exists in historical information of historical prefetching operations for the memory page;
   in response to determining that the flag associated with the prefetching operation exists in the historical information, determining the initial window size of the prefetching operation based on the historical information;
   in response to determining that the flag associated with the prefetching operation does not exist in the historical information, avoiding triggering execution of the prefetching operation; and
   having determined the initial window size of the prefetching operation based on one of the read request size and the historical information:
   in order to reduce memory consumption of the prefetching operation, setting an actual window size of the prefetching operation to a minimum of (i) a predetermined ratio of the initial window size to a first specified value and (ii) a buffer cache size of a buffer cache; and
   triggering the execution of the prefetching operation to prefetch the memory page to the buffer cache using the set actual window size of the prefetching operation.

2. The method of claim 1, wherein determining the initial window size of the prefetching operation based on the historical information comprises:
   determining the initial window size based on a window size of a last prefetching operation from among the historical prefetching operations.

3. The method of claim 2, further comprising:
   in response to the prefetching operation being completed, clearing the flag associated with the prefetching operation.

4. The method of claim 2 wherein determining the initial window size based on the window size of the last prefetching operation from among the historical prefetching operations comprises:
   setting the initial window size of the prefetching operation to a product of the window size of the last prefetching operation and a third specified value.

5. The method of claim 1, further comprising:
   in response to the prefetching operation being completed, setting a flag associated with a subsequent prefetching operation.

6. The method of claim 1 wherein determining the initial window size of the prefetching operation based on the read request size comprises:
   setting the initial window size of the prefetching operation to a product of the read request size and a second specified value.

7. An electronic device, comprising:
   at least one processing unit; and
   at least one memory coupled to the at least one processing unit and storing machine-executable instructions, the instructions, when executed by the at least one processing unit, causing the electronic device to perform acts, the acts comprising:
   receiving a read request for a memory page,
   determining whether the read request is an initial read request for the memory page, the read request having a read request size;
   in response to determining that the read request is the initial read request for the memory page, determining an initial window size of a prefetching operation based on the read request size;
   in response to determining that the read request is not the initial read request for the memory page, determining whether a flag associated with the prefetching operation exists in historical information of historical prefetching operations for the memory page,
   in response to determining that the flag associated with the prefetching operation exists in the historical information, determining the initial window size of the prefetching operation based on the historical information;
   in response to determining that the flag associated with the prefetching operation does not exist in the historical information, avoiding triggering execution of the prefetching operation; and having determined the initial window size of the prefetching operation based on one of the read request size and the historical information:
  in order to reduce memory consumption of the prefetching operation, setting an actual window size of the prefetching operation to a minimum of (i) a predetermined ratio of the initial window size to a first specified value and (ii) a buffer cache size of a buffer cache; and
  triggering the execution of the prefetching operation to prefetch the memory page to the buffer cache using the set actual window size of the prefetching operation.

8. The electronic device of claim 7, wherein determining the initial window size of the prefetching operation based on the historical information comprises:
  determining the initial window size based on a window size of a last prefetching operation from among the historical prefetching operations.

9. The electronic device of claim 8, the acts further comprising:
  in response to the prefetching operation being completed, clearing the flag associated with the prefetching operation.

10. The electronic device of claim 7, the acts further comprising:
  in response to the prefetching operation being completed, setting a flag associated with a subsequent prefetching operation.

11. A computer program product having a non-transitory computer readable medium which stores a set of instructions to perform prefetching; the set of instructions, when carried out by computerized circuitry, causing the computerized circuitry to perform a method of:
  receiving a read request for a memory page;
  determining whether the read request is an initial read request for the memory page, the read request having a read request size;
  in response to determining that the read request is the initial read request for the memory page, determining an initial window size of a prefetching operation based on the read request size;
  in response to determining that the read request is not the initial read request for the memory page, determining whether a flag associated with the prefetching operation exists in historical information of historical prefetching operations for the memory page;
  in response to determining that the flag associated with the prefetching operation exists in the historical information, determining the initial window size of the prefetching operation based on the historical information;
  in response to determining that the flag associated with the prefetching operation does not exist in the historical information, avoiding triggering execution of the prefetching operation; and
  having determined the initial window size of the prefetching operation based on one of the read request size and the historical information:
    in order to reduce memory consumption of the prefetching operation, setting an actual window size of the prefetching operation to a minimum of (i) a predetermined ratio of the initial window size to a first specified value and (ii) a buffer cache size of a buffer cache; and
    triggering the execution of the prefetching operation to prefetch the memory page to the buffer cache using the set actual window size of the prefetching operation.

12. The computer program product of claim 11, wherein determining the initial window size of the prefetching operation based on the historical information comprises:
  determining the initial window size based on a window size of a last prefetching operation from among the historical prefetching operations.

13. The computer program product of claim 12, wherein the machine executable instructions which, when executed, cause the machine to further perform:
  in response to the prefetching operation being completed, clearing the flag associated with the prefetching operation.

14. The computer program product of claim 11, wherein the machine executable instructions which, when executed, cause the machine to further perform:
  in response to the prefetching operation being completed, setting a flag associated with a subsequent prefetching operation.

* * * * *